Figure 4:
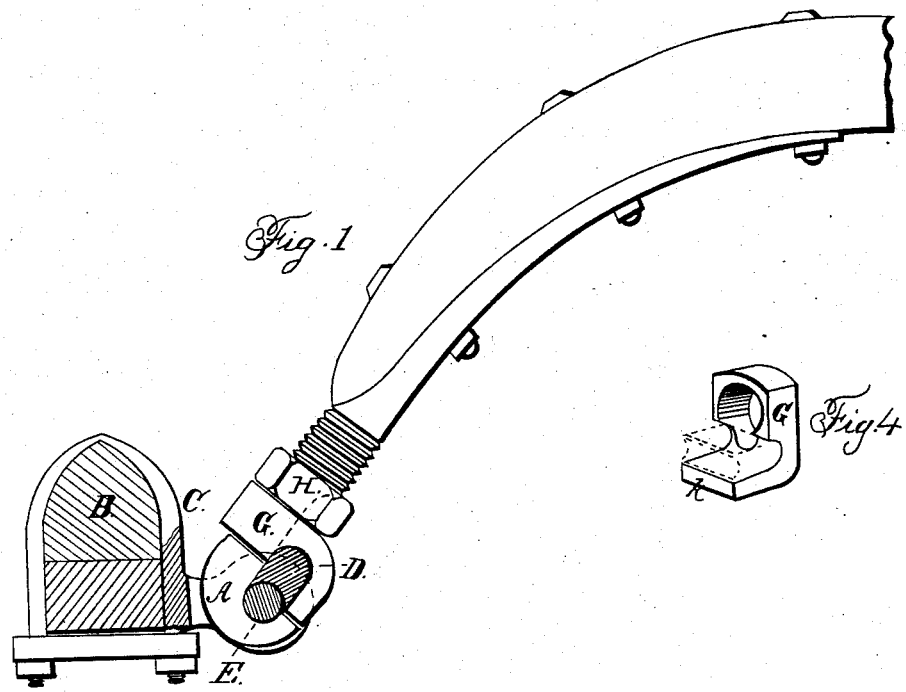
Figure 2:
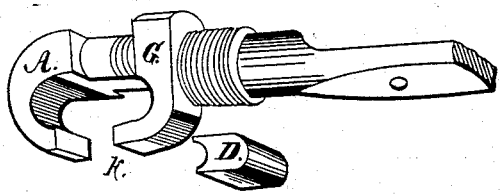
Figure 3:
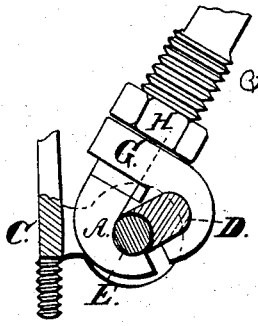

278. LAND VEHICLES-ANIMAL DRAFT APPLIANCES.
77
44

D. BLY.

Thill-Coupling.

No. 317. A. I. Patented Mar. 12, 1861.

Witnesses.
J. Fraser
S. J. Allen

Inventor.
Douglas Bly

N. PETERS, PHOTO-LITHOGRAPHER, WASHINGTON, D. C.